Figures 1, 2:
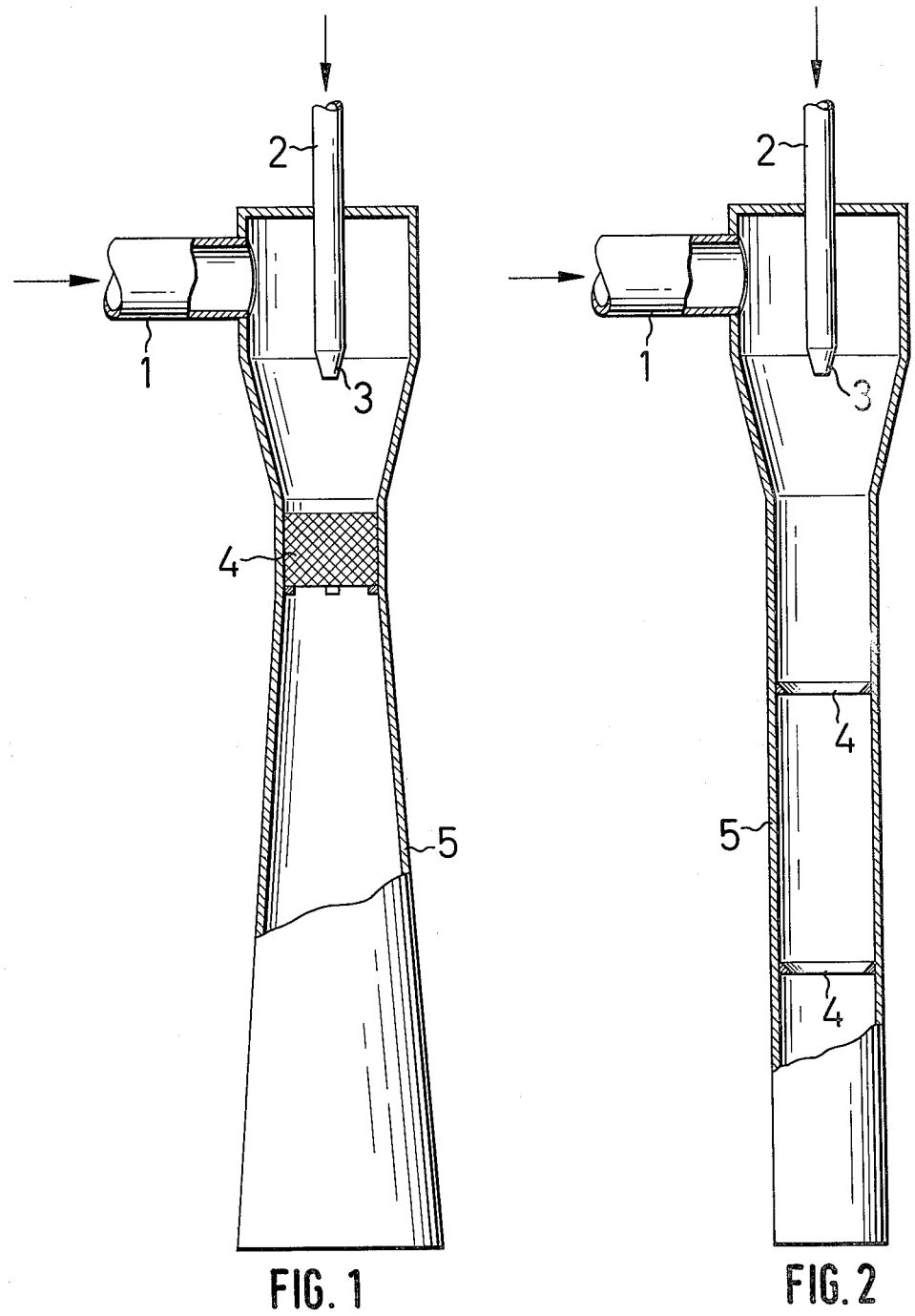

United States Patent [19]

Ulrich et al.

[11] 4,411,846
[45] Oct. 25, 1983

[54] APPARATUS FOR ABSORBING GASES

[75] Inventors: Michael Ulrich, Kelkheim; Manfred Trautmann, Frankfurt am Main; Günter Heck, Wiesbaden; Egon Malow, Hochheim am Main, all of Fed. Rep. of Germany

[73] Assignee: Hoechst Aktiengesellschaft, Frankfurt am Main, Fed. Rep. of Germany

[21] Appl. No.: 125,882

[22] Filed: Feb. 29, 1980

[30] Foreign Application Priority Data

Mar. 2, 1979 [DE] Fed. Rep. of Germany ....... 2908263

[51] Int. Cl.³ ............................................. B01D 47/16
[52] U.S. Cl. ....................................... 261/98; 55/233; 55/241; 261/DIG. 54; 261/116
[58] Field of Search ................... 55/90, 233, 240, 241; 261/116, DIG. 54, 78 A, 98; 417/151

[56] References Cited

U.S. PATENT DOCUMENTS

| 895,790 | 8/1908 | Richards | 261/116 |
| 3,488,039 | 1/1970 | Ekman | 55/241 |
| 3,970,740 | 7/1976 | Reeder et al. | 261/DIG. 54 |

FOREIGN PATENT DOCUMENTS 1815280  6/1970  Fed. Rep. of Germany ........ 55/233

OTHER PUBLICATIONS

Water Jet Scrubber-Heil Process Equipment Corp., Cleveland, Ohio, dtd. 5/72, pp. 1-4, Bulletin B 770.
Design & Application of Jet Venturi Fume Scrubber Groll-Reynolds Co., Westfield, N.J., dtd. 6/75, Brochures FS71, pp. 1-5.

Primary Examiner—Bernard Nozick
Attorney, Agent, or Firm—Curtis, Morris & Safford

[57] ABSTRACT

Jet venturi apparatus for absorbing a gas by washing liquid provided with stack of packings extending across the throat.

3 Claims, 2 Drawing Figures

APPARATUS FOR ABSORBING GASES

The present invention relates to a device for absorbing gasses by liquids which uses jet pipes. The process may be applied especially to those systems, wherein the gas absorption in liquid is coupled with a chemical reaction of the gas component. The absorption capacity of the apparatus used, that is, the quantity of gas absorbed by the liquid, depends on the gas/liquid interfacial area present in the apparatus.

This invention is especially important for carrying out a reaction of a gaseous component A with a liquid reactant B yielding a liquid or a mass C dissolved in the liquid, because if the technique of this invention is followed the liquid sprayed into the pipe has as great a surface area as possible. For the chemical absorption of gasses such as $SO_2, SO_3, Cl_2, HCl, H_2S, HF$ or $HBr$ on an industrial scale both jet pipes and Venturi washers are used. Such gasses are very often contained in the exhaust, or off-air of production plants, wherein they are to be found in low concentrations. They have to be removed from this off-air until a minimum acceptable concentration is reached.

Ullmann, 4th edition, 1973, vol. 3. pages 382 to 385 discloses processes for absorbing gasses using jet pipes or Venturi washers. However, all of the processes and devices disclosed in said reference have the disadvantage of showing a less-than-satisfactory degree of absorption that is, a specific mass transfer area that is far below the optimum.

Consequently, there exists in the prior art a need to improve the specific mass transfer are between washing liquid and gas.

This task is solved by the apparatus of the present invention, which comprises atomizing the washing liquid into the jet pipe at a rate from 100 to 1,500 $m^3/h$ and per $m^2$ of cross-sectional area under a pressure from 3 to 25 bars and passing the gasses through the jet pipe at a rate of from 0.5 to 35 m/s, preferably of from 0.5 to 10 m/s.

The washing liquid and the gas are suitably passed over deflectors mounted in the tube section of the jet pipe.

The apparatus of the invention is suitably performed using a jet pipe, wherein the ratio between length and diameter of the tube section of the jet pipe is from 5:1 to 50:1. Suitably several jets are arranged in the jet pipe, when the diameter of the jets has to be greater than 50 mm. The deflectors can be for example static mixers, packings of knitted wire mesh, or dumped tower packings arranged over the whole cross-sectional area, the packings being arranged in one or several layers. However, the height of the layers or packings should not exceed the diameter of the jet pipe. These deflectors serve the purpose of further dispersing the droplets sprayed into the gas zone by the turbulent interaction with the gas current and to form a greater specific surface area.

When mounted only at the wall of the jet pipe, these deflectors, that may be rings of any of various cross-sectional shapes, for example of quadriform, rectangular, triangular or circular cross-sectional shapes, are arranged in the tube or diffuser in that zone where generally a liquid film flows down the wall. They serve to destroy this film and to promote dispersion of the liquid in drop form in the gas current. It has now been found that one or several rings may be fixed at the wall. Moreover, the tube wall may have a corrugated surface instead of a smooth surface so that the liquid film becomes highly turbulent and the drops are even incorporated by dispersion into the gas current.

The following drawings and the description referring thereto serve to illustrate the present invention.

FIG. 1 represents a jet pipe with diffuser.
FIG. 2 represents a jet pipe with tube section.

A gas is fed to the jet pipe via a gas conduit 1 and a washing liquid is fed to the jet pipe via a liquid conduit 2. The washing liquid is sprayed through jets 3 under a pressure of from 3 to 25 bars. The gas and the liquid are passed over deflectors 4 mounted in a tube section 5 of the jet pipe. The deflectors are arranged either over the complete cross-sectional area of the tube section of the jet pipe as shown in FIG. 1 or at the tube walls in the form of rings as shown in FIG. 2. Several rings may be arranged in the tube section.

EXAMPLE 1

A sodium sulfite solution was atomized into a jet pipe of 1,180 mm total length and of 100 mm diameter at the narrowest position, at a rate of 5 $m^3/h$ under a pressure of 5 bars. The jet pipe was provided with a diffuser. The air velocity was in the range from 1 to 20 m/s. According to the method of Reith, Dissertation, Delft, 1968 the mass transfer area was measured to be approximately 70 $m^2$.

The mass transfer area was measured with air velocities from 1 to 6 m/s using different deflectors and compared with that found in the tube section without deflectors. The following data were found:
  (a) The mass transfer area was 1.15 to 1.6 times greater when using Pall rings of 15×15 mm in a thickness of layer of 15 mm.
  (b) The mass transfer area was 1.15 to 1.3 times greater when using a Sulzer mixer of the type SME 16.Y of 80 mm height.
  (c) The mass transfer area was 1.9 times greater when using a so-called dimister (packing of knitted wire mesh) of 85 mm height.

EXAMPLE 2

A sodium sulfite solution was atomized into a jet pipe having a cylindrical tube of 100 mm diameter and a total length of 1,180 mm at a rate of 5 $m^3/h$ under a pressure of 5 bars. The air velocity was from 1 to 20 m/s. A mass transfer area of approximately 70 $m^2$ was measured according to the method of Reith. Subsequently 2 rings of triangular cross-section and of 3 mm height, were arranged in the tube section of the jet pipe at a distance of 270 mm to each other. The mass transfer area measured thereafter was about 1.3 times greater.

EXAMPLE 3

A sodium sulfite solution was atomized into a jet pipe having a cylindrical tube of 100 mm diameter and a total length of 1,180 mm. The mass transfer area of the system consisting of sodium sulfite solution and air was measured with an air velocity of approximately 20 m/s with various pressures of the jets and compared subsequently with one another. Compared with a pressure of 3 bars the mass transfer area measured was 3.2 times greater when applying a spraying pressure of 11 bars, 3.7 times greater when applying a pressure of 14 bars and 4.8 times greater when applying a pressure of 18 bars. Compared with results obtained when applying a pressure of 8 bars the mass transfer area was found to be 1.5 times greater when applying 14 bars and 2 times greater when applying 18 bars.

What is claimed is:

1. Jet Venturi apparatus for absorbing a gas by a washing liquid comprising gas conduit means for injecting said gas;

atomizing means for injecting said liquid as a spray into the injected gas;

a tube coupled to said gas conduit means for carrying the gas and liquid spray and having a length and a diameter whose ratio is in the range of from 5:1 to 50:1; and diffuser means disposed in the tube and having a throat in the tube at the end thereof adjacent said gas conduit means for disrupting the flow of said gas and liquid spray as the same pass through said tube so at to disperse droplets of said liquid spray to increase the specific surface area of said liquid spray, said diffuser means including a stack of packings extending across the cross-sectional area of said tube at said throat, the stack having a length not in excess of the diameter of the tube.

2. Jet pipe apparatus according to claim 1, wherein said stack of packings includes a knitted wire mesh.

3. Jet pipe apparatus according to claim 2, wherein the length of said stack is approximately 85% of the diameter of the tube section.

* * * * *